Oct. 14, 1930.　　　I. T. THORNTON ET AL　　　1,778,049
PROCESS AND APPARATUS FOR AGITATING MATERIALS
Filed June 4, 1928　　2 Sheets-Sheet 1
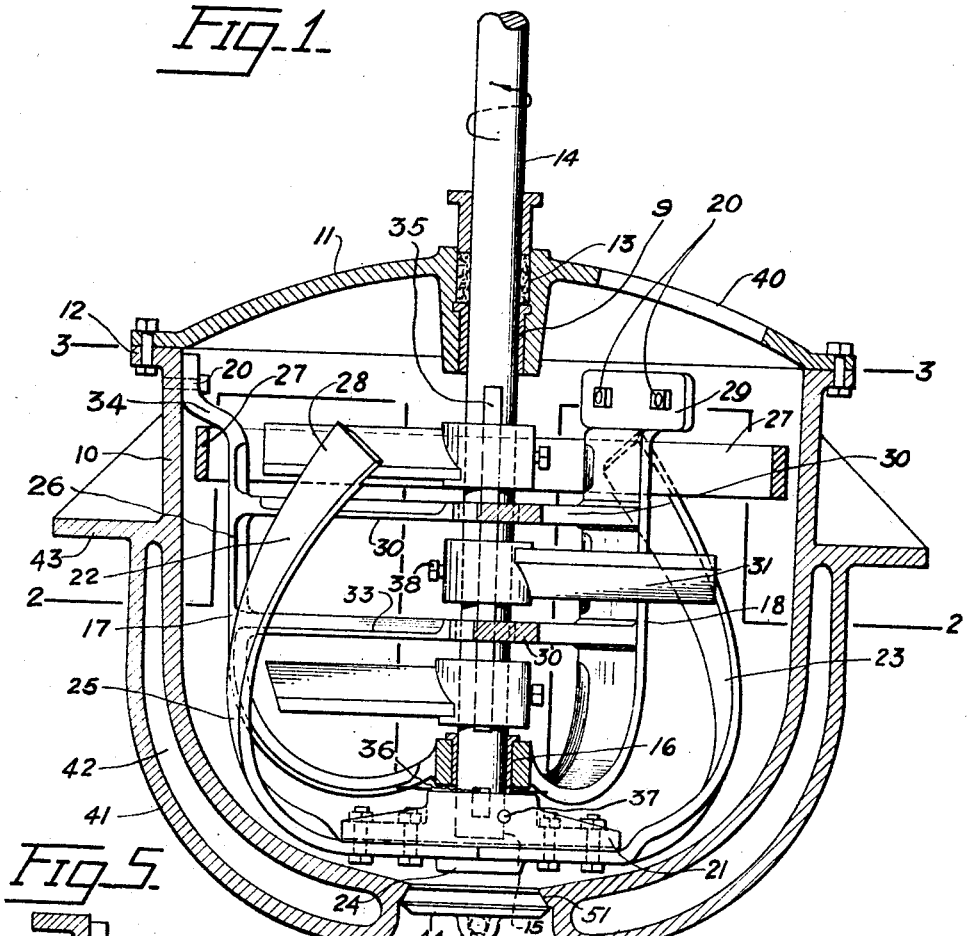
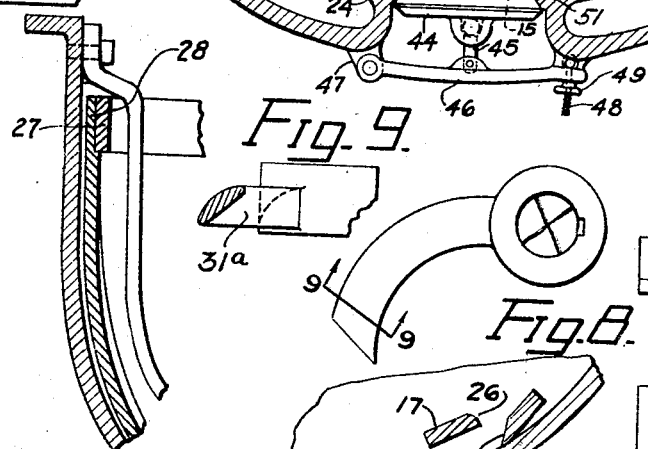
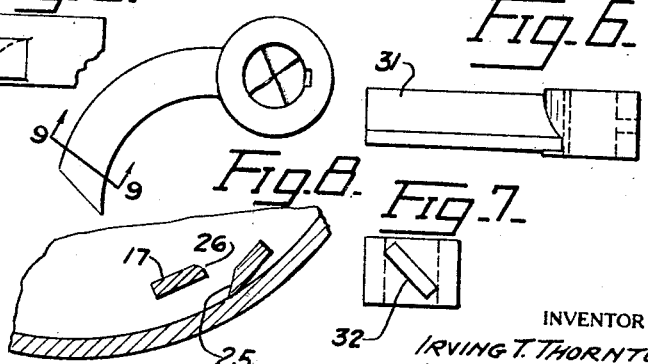
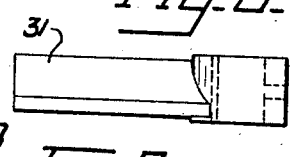
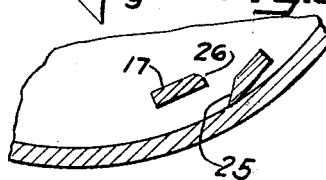
INVENTOR
IRVING T. THORNTON
JOYCE H. CROWELL
BY
ATTORNEY Oct. 14, 1930.  I. T. THORNTON ET AL  1,778,049
PROCESS AND APPARATUS FOR AGITATING MATERIALS
Filed June 4, 1928  2 Sheets-Sheet 2
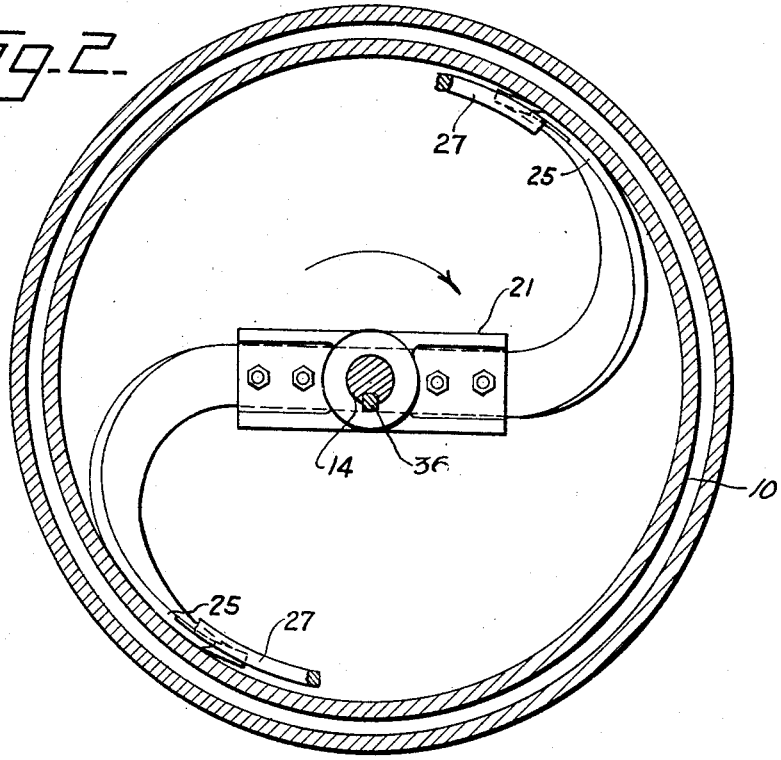
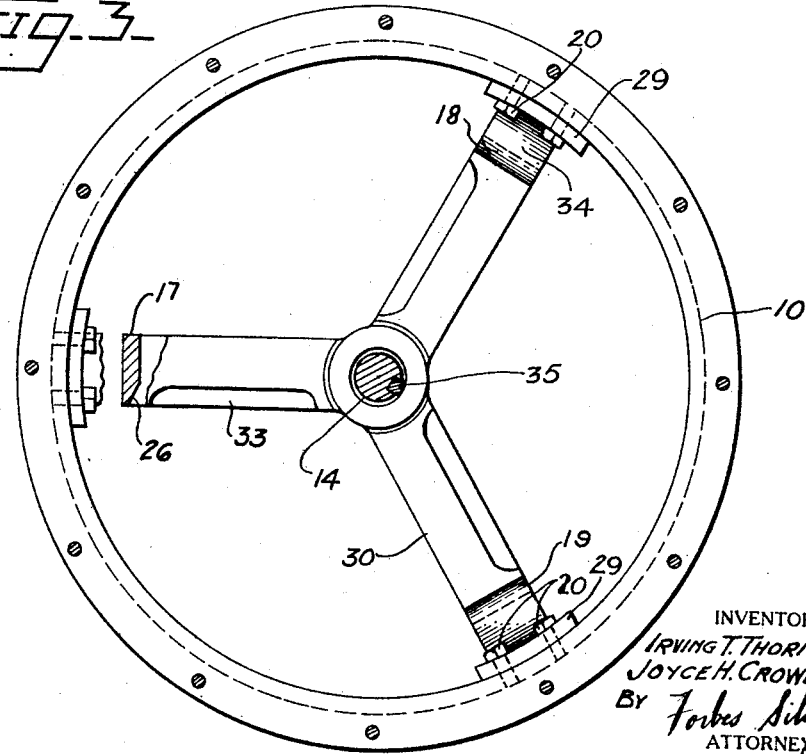
INVENTOR
IRVING T. THORNTON
JOYCE H. CROWELL.
BY Forbes Silsby
ATTORNEY Patented Oct. 14, 1930

1,778,049

UNITED STATES PATENT OFFICE

IRVING T. THORNTON AND JOYCE H. CROWELL, OF BUFFALO, NEW YORK, ASSIGNORS TO NATIONAL ANILINE & CHEMICAL COMPANY, INC., OF NEW YORK, N. Y., A CORPORATION OF NEW YORK

PROCESS AND APPARATUS FOR AGITATING MATERIALS

Application filed June 4, 1928. Serial No. 282,635.

This invention relates to the agitation of materials, and in particular to the agitation of viscous materials. It relates more specifically to a process and apparatus for agitating materials involved in a chemical reaction.

In general it is important for the production of a satisfactory product that reacting materials be kept in a substantially homogeneous condition during the course of a reaction, and, if they are being heated, that the heating approach uniformity throughout the mass; such a condition is particularly desirable when the reaction mass passes through a viscous stage. It is also advantageous in the treatment of substances which pass through a final drying stage that the material be maintained in a condition of fine subdivision, not only to secure a uniform product but also to give ease in handling.

The present invention accomplishes these ends by shearing material away from the wall of the vessel in which the reaction is carried out, and changing peripheral movement imparted to the sheared material into an inward radial movement. In addition, particularly when viscous materials are treated, a downward axial movement, which may be accompanied by an outward radial bottom movement, is imposed upon the remaining interior portion of the mass, thus creating a positive circulation in all portions. Alternatively, when very heavy material is being treated, an upward axial movement also may be imparted to the material to assist in its circulation.

Suitable apparatus for carrying out these steps comprises a movable member in close contact with the vessel wall, the member being inclined to impart a shearing action, and also inclined to impart a lifting action, and a fixed member cooperating with the movable fixed member to cause the inward radial component of motion in the material. Downward, or upward, interior pressure upon the material is imposed by structural members, likewise comprising movable members and cooperating fixed members. The preferred structure also embodies a disposition and conformation of parts whereby the load on the driving mechanism is made substantially uniform throughout a rotation of the movable members, thus requiring a minimum force and avoiding sudden and repeated changes in load. In addition rigidity is obtained in conjunction with a suspension of the agitating apparatus from the rim or edge of the vessel.

The invention will be further described in connection with the embodiment illustrated in the accompanying drawing, which shows one form of apparatus comprehended within its scope.

In the drawing—

Fig. 1 is a vertical section of a kettle with the agitating mechanism suspended therein;

Fig. 2 is a plan view, taken along the line 2—2 of Fig. 1, of the kettle and modified movable peripheral members or blades, the other parts being omitted;

Fig. 3 is a plan, taken along line 3—3 of Fig. 1, of the kettle and the fixed periperal members, partly in section, the other parts being omitted;

Fig. 4 is a detail showing a blade in section and a cooperating fixed member in section;

Fig. 5 is a vertical section through a blade and a ring secured to the blade end;

Figs. 6 and 7 are an elevation and end view, respectively, of an interiorly mounted movable blade;

Fig. 8 is an elevation of a modified form of interiorly mounted movable blade; and Fig. 9 is a vertical section through the blade of Fig. 8, taken along the line 9—9 of Fig. 8.

A kettle 10 has a cover 11 secured to its rim 12, and in the cover is provided a central stuffing box 13 and bearing 9 for an agitator shaft 14. The upper end of the shaft is supported in any well known manner (not shown) and driven by suitable mechanism. The lower end 15 of the shaft within the vessel is guided or journaled in a bearing 16 which is supported near the bottom of the kettle by arms 17, 18 and 19. These arms are curved upwardly to parallel in spaced relation the contour of the vertical section or an element of the wall of the kettle. The upper ends of the arms adjacent the rim are bent outwardly and are formed into flanges 29 which are secured to the rim of the kettle in any suitable manner, as by bolts 20.

The lower end 15 of the shaft projects beyond the bearing 16, and secured to the end, as by key 36 and pin 37, is a bracket 21. Two agitator blades 22, 23 are bolted to the bracket, and are preferably welded together at their abutting ends forming a unitary agitator. Each blade is of the ribbon type, shaped in conformity with the vessel wall to have preferably a touching but not a rubbing contact therewith, and for this purpose is provided with a beveled forward edge 25 in scraping relation with the vessel wall. Each blade is also turned at an angle to the vessel wall, as shown in Fig. 4, to provide clearance for the rear portion of the blade, to secure a breaking action, and to impart a radially inward motion to the material with which it comes in contact. The blades are preferably of a sufficient length to cooperate with the greater portion of the vessel wall.

The spacing of the fixed arms 17, 18 and 19 from the wall of the vessel is such that clearance for rotation of the agitator blades is provided, while at the same time a shearing action between the blades and fixed arms is obtained; so that the fixed arms constitute breaker arms for separating material from the blades. The breaking action of the fixed arms is furthered, according to the preferred embodiment, by also beveling the approach edge 26 of the fixed arms. The blades are also given an inclination or slope away from the bracket to increase the extent of the shearing action between the fixed arms and the blades.

The curvature given the blade for embodying the slope or inclination is preferably one that gives substantially a constant angle between the cooperating edges of a fixed arm and a blade for substantially the full length of the edges; in other words, the angular relation between a blade edge and the elements of the wall is substantially uniform, and obviously the blade curvature depends upon the contour of the wall of the kettle.

In order to secure a uniform distribution of the load on the driving mechanism, the length and the curvature of a blade are so interrelated, having regard for the number of breaker arms, the shape of the vessel and the height in the vessel to which the agitation is desired, that an agitator blade and a breaker arm are in shearing relation at substantially any period during the revolution of the agitator. By having the blade of a substantially uniform slope, and by making the blades of such length that only one is in contact with a breaker arm at any period of time, the force required to shear material between the breaker arms and the agitator blades is substantially uniform throughout a revolution of the agitator. Thus, in the specific embodiment shown, with three breaker arms spaced at about 120°, two diametrically opposite agitator blades, and an agitator blade of uniform slope and of such length that it "subtends" an arc of about 60° (that is, an angular rotation of the shaft of about 60° is required for the full length of the blade to pass an element of the wall of the vessel) substantially only one blade is in shearing relation with a breaker arm at any one instant of time. It will be apparent that by proper correlation of the number, slope and length of blades, and the number and location of breaker arms, the load on the driving mechanism may be made uniform in other ways, as by having several blades in shearing relation with several breaker arms at any period of time.

The blade may be of the same width throughout as shown in Fig. 2, or as shown in Fig. 1 it may be wider or flared near the bracket; or in some cases, as where especially viscous material is treated, additional strength may be provided in the lower portion of the blade where the strain is greatest by forming this portion of relatively large cross section and then gradually tapering the blade towards the upper end where the strain is less. The arms 17, 18 and 19 may also be tapered from the upper to the lower portion thereof to provide increased strength where the strain is greatest.

A bar 24, extending downwardly from the middle portion of the agitator and secured to it as by welding, aids in agitating material which tends to settle toward the bottom of the vessel, and also assists in discharging the vessel through the bottom opening 51. The bracket 21 and the bar 24 welded to the blades 22, 23 serve to impel material outwardly from the interior at the bottom of the kettle for replacement by overlying interior portions.

In order to increase the agitating, impelling, and discharging action, the bar 24 can be curved instead of being straight, as shown, or it may be formed so as to increase the plowing action of the lower part of the blades 22, 23 as by being made in the form of a continuation thereof. Furthermore, several plates or bars may be welded to the lower part of the agitator instead of the single bar 24.

The inclination of the blade with respect to the direction of rotation may be forward or backward. For materials of high viscosity and toughness, however, the backward inclination is preferred, for this supplies lifting action to the peripheral portions of the material upon rotation of the blade, which completes the cycle of positive movement imparted to the material in the generally axial planes, as well as lessens the strain placed upon the blade as compared with that imposed by the forward inclination.

If desired, the upper ends of the blades can be joined by a ring 27 to give them additional stiffness and strength. The ring can be welded or otherwise secured to the blades which are preferably recessed, as indicated by 28 in Fig. 5, to receive the ring; the ring, however, can be recessed to receive the blades; or both can be recessed.

For imposing a downward controlled movement on interior portions of the material within the vessel, sets of radial blades 31 are fixed to the shaft 14 in any suitable manner, as by the single key 35, and set screws 38. Instead of the single key 35, obviously separate keys for the individual blades may be employed. These radial blades are of a number depending on the depth of the kettle and on the material treated, and are preferably axially spaced at equal distances from each other and staggered so that the arc subtended by any pair of adjacent blades is the same as that subtended by any other pair. The radial blades are moreover preferably so placed as to act as a counterbalance for the agitator blades, so that the load on the driving mechanism is balanced as well as distributed.

Cooperating with these radial blades are sets of radial cross arms 30 which connect the fixed arms 17, 18 and 19, and which are adapted to shear material from contact with the blades 31. These cross arms are shown integral with the fixed arms, but may be made in any desired manner, and they have an axial bore providing clearance for the rotation of shaft 14 and key 35. The number of sets of cross arms will also depend on the depth of the kettle and the material to be agitated.

With most materials the downward pressure ordinarily required to bring about intimate mixing is relatively small, and a single radial blade for each set of cross arms, as a general rule, is found to give sufficient downward flow without any noticeably variable effect on the drive. Such an arrangement affords a minimum interference with access to and removal of material. The radial blades may have any suitable pitch, but are preferably so positioned that the pressure-applying surface 32 (Fig. 7) gives some outward as well as downward component of motion by having the major portion of the surface forward of a radial-axial plane. The downward component of motion is imparted by inclining each axial blade, the degree of inclination depending on the degree of downward pressure desired. The stationary arms 30 are beveled at the approach edge 33 to shear the material from the path of the blades.

Instead of being straight, as shown in Fig. 6, the radial blades 31 can be curved, as shown in Fig. 8, to supply increased outward radial motion; and the surface 32 instead of being flat as in Fig. 7 can also be curved, as shown in Fig. 9. Furthermore, in some cases, as when treating heavy material, instead of imposing a downward motion on the interior portions of the mass, an upward motion is sometimes necessary in order to obtain adequate mixing. This can be secured by having the radial blades pitched in the opposite direction, as shown for example in Fig. 9. It will be understood that by reversing the radial blades on the shaft or by providing a number of sets of interchangeable blades, either downward or upward motion can be secured with the same apparatus.

An alternative method (not shown) of readily securing either upward or downward interior motion is the provision of a hollow or quill exterior shaft carrying the radial arms and being independently driven, and another shaft extending through and below said hollow shaft, carrying the bracket and agitator arms, and also independently driven. By reversing the direction of rotation of the hollow shaft, a change from either upward or downward interior motion then may be secured without demounting any of the elements. It is evident that by providing independent drives for the two shafts their speeds of rotation may be relatively varied, their speeds of rotation or angular velocities depending on the material being treated.

The selection of three fixed arms to support the bottom bearing 16 and coact with the agitator blades is for the purpose of providing a structure that is comparatively rigid and resistant to thrust in any radial direction. With the arms so arranged it is found that the agitator structure can be used in kettles of considerable depth without chattering or necessitating a bearing fixed near the bottom of the kettle.

Although the above described arrangement of fixed arms and method of mounting them are preferred, it is evident that any suitable number of fixed arms may be provided, and that they may be variously mounted. Thus, instead of fixing the arms to the rim of the kettle, it is evident that they can be attached to the cover. With the arrangement shown, the bends 34 in the ends of the arms coact with the upper edges of the blades to shear material that may be engaged by the latter.

The kettle or vessel is charged through a suitable opening 40 which can be closed if desirable. For heating the vessel, when necessary, any of the well known means can be employed, a jacket 41 being illustrated to enclose a steam space 42 having suitable inlet and outlet openings (not shown). Supporting flanges 43 extend from the jacket. A discharge means for a central bottom outlet opening 51 is also shown. This consists of a closure 44 secured by link 45 to a hinged member 46 which may be pivotally secured to wall 41 by means of a lug 47 attached to one end thereof, while the opposite end is provided with a slot. A pivoted threaded rod 48 projects through the slot and serves together with nut 49 associated therewith to secure the closure in position. The particular form of discharging means shown forms no part of the invention, and various other suitable devices may be substituted therefor.

From the foregoing it is believed that the operation of the agitator is evident. The peripheral blades shear and simultaneously lift material from the walls, the fixed arms 17, 18, 19 promote the conversion of any peripheral movement of the material into a radial one, and material is thus directed away from the wall and toward the interior. At the same time material at the bottom is forced toward the periphery by the bracket 21 and the bar 24, and central portions are given some outward and either a downward or upward impetus by the radial blades, when these are present, providing a positive replacement of peripheral portions by the central portions of the mass and maintaining the mass in a substantially homogeneous condition. Baking of material on the wall of the vessel is thus avoided when heat is applied. The entire mass is kept in a state of movement, and the shearing action between the movable and the fixed elements not only restrains a peripheral or turning movement of the mass but also prevents lumping within the mass.

When the material is passing through a drying state, the shearing action between the rotating and fixed elements maintains a subdivided condition of the mass and results in a grinding or pulverizing of the dried product.

The process and apparatus are adaptable to a number of chemical reactions wherein agitation and intimate mixing of viscous materials are required, and has been found to be especially applicable to such reactions as Friedel-Crafts condensations, particularly in the preparation of anthraquinone compounds, in the production of sulfur dyes by a fusion process, and the like. It is to be understood, however, that the invention is not restricted to such uses but can be employed wherever agitation, especially of viscous materials, is required.

We claim:

1. A method of agitating a mass contained in a vessel which comprises scraping from the wall of the vessel portions of the mass in contact with said wall, imparting a substantial inward radial movement to said portions, positively replacing said portions by central portions of the mass, and shearing said central portions.

2. A method of homogenizing a mass contained in a vessel and passing through a viscous liquid stage and a drying stage, which comprises positively circulating the mass in generally radial directions of the vessel during the viscous stage, and grinding the mass in the same vessel during the drying stage.

3. A mixing apparatus comprising in combination a vessel, an agitator within said vessel having a blade in shearing contact with the wall of the vessel, and a breaker arm supported within said vessel in shearing relation with said agitator blade.

4. A mixing apparatus comprising in combination a vessel, an agitator within said vessel having a blade of the ribbon type in inclined shearing contact with the wall of the vessel, a breaker arm suspended within said vessel in operative relation with said agitator blade and extending in an axial direction, and a guiding means for said agitator supported by said breaker arm within the vessel.

5. A mixing apparatus comprising in combination a vessel, a rotatable agitator within said vessel having a plurality of inclined blades, and a plurality of breaker arms suspended within said vessel in coacting relation with said blades, the number of said blades and their inclination relative to the breaker arms being such that their coaction is substantially constant throughout a rotation of the agitator.

6. A mixing apparatus comprising in combination a vessel, an agitator within said vessel having inclined blades in shearing contact with the vessel walls to impart movement to portions of the material, means associated with said blades for directing sheared portions of material inwardly of the vessel, means for shifting interior portions in a generally axial direction, and means causing an outward movement of the shifted interior portions.

7. In a mixing apparatus, a vessel, a rotatable shaft axially supported from a point without said vessel, an agitator blade mounted on the inner portion of said shaft, a bearing for the inner portion of said shaft, means for supporting said bearing, means for shearing material from said agitator blade, and means for directing the sheared material inwardly of the vessel.

8. In a mixing apparatus, a vertical vessel, a rotatable shaft axially supported from a point above said vessel, an agitator blade mounted on the lower portion of said shaft, a bearing for the lower portion of said shaft, and a unitary means for supporting said bearing, for shearing material from said agitator blade and for directing the sheared material inwardly of the vessel.

9. In a mixing apparatus, a vertical vessel, a rotatable shaft axially supported from a point above said vessel, an agitator blade mounted on the lower portion of said shaft, a bearing for the lower portion of said shaft, and a unitary means for supporting said bearing, for shearing material from said agitator blade and for directing the sheared material inwardly of the vessel, said means being fixed to the wall of said vessel at a point above the agitator blade.

10. A mixing apparatus comprising in combination a vessel, a cover for said vessel, a rotatable agitator shaft extending through said cover, a bearing for said shaft within but spaced from the wall of said vessel, said shaft having an end projecting through said bearing to a point above the bottom of said vessel, breaker arms extending from said bearing in spaced substantially parallel relation to an element of the vessel wall and having their ends secured to said wall adjacent the cover, said arms being of a number and disposition to resist thrust in any radial direction, a bracket fastened to the projecting end of the shaft, and agitator blades carried by said bracket, each of said blades having a double curvature, one curvature being in substantial conformity to an element of the vessel wall and the other curvature providing a substantially uniform inclination relative to an element of the vessel wall, said blades having shearing engagement with the wall and with said breaker arms, and the number of said blades and their inclination being such that the shearing action with relation to the breaker arms is substantially constant during rotation of the agitator blades.

11. A mixing apparatus comprising in combination a vessel, a rotatable agitator within said vessel having a plurality of inclined blades of the ribbon type in shearing relation with the inner wall of said vessel, and a plurality of breaker arms suspended within said vessel in coacting relation with said blades, the number of said blades and their inclination relative to the breaker arms being such that their coaction is substantially constant throughout the rotation of the agitator.

12. A mixing apparatus comprising in combination a vessel, an agitator within said vessel having inclined blades in shearing contact with the vessel wall to impart movement to portions of the material, means associated with said blades for directing sheared portions of material inwardly of the vessel, and a unitary means for shifting interior portions of material in a generally axial direction and for causing an outward movement of said interior portions.

13. In a mixing apparatus, a vertical vessel, a rotatable shaft axially supported from a point above said vessel, an agitator blade mounted on the lower portion of said shaft, a bearing for the lower portion of said shaft, means for supporting said bearing extending within said vessel in an axial direction, and a unitary means for shearing material from said agitator blade and for directing the sheared material inwardly.

14. In a mixing apparatus, a vertical vessel, a rotatable shaft supported from a point above said vessel and extending axially within said vessel to a point above the bottom thereof, a rearwardly inclined agitator blade of the ribbon type mounted on the lower end of said shaft and in shearing relation with the inner wall of said vessel, a bearing for the lower portion of said shaft, and a unitary means for supporting said bearing for shearing material from said agitator blade, and for directly the sheared material inwardly, said means being fixed to the wall of said vessel at a point above the agitator blade.

15. A mixing apparatus comprising in combination a vessel, a rotatable shaft supported from a point without said vessel and extending axially into but not through said vessel, a breaker arm supported by an inner wall of said vessel and extending within said vessel in an axial direction and in spaced relation to said wall, and an agitator blade carried by said shaft in cooperative relation with said arm and with said wall.

16. A mixing apparatus comprising in combination a vessel, a rotatable shaft axially supported from a point without said vessel, a breaker arm supported by an inner wall of said vessel and extending within said vessel in an axial direction and in spaced relation to said wall, and an inclined ribbon agitator blade mounted on said shaft between said breaker arm and said wall in shearing relation with said breaker arm and with said wall.

17. A mixing apparatus comprising in combination a vessel, a rotatable shaft supported from a point without said vessel and extending axially into but not through said vessel, a breaker arm supported by an inner wall of said vessel and extending within said vessel in an axial direction and in spaced relation to said wall, and an inclined ribbon agitator blade mounted on said shaft between said breaker arm and said wall in shearing relation with said breaker arm and with said wall, the angle formed between said breaker arm and said agitator blade being substantially uniform throughout the length of said blade.

18. A mixing apparatus comprising in combination a vertical vessel, a plurality of breaker arms mounted on the interior of said vessel and extending in an axial direction in spaced relation to an inner wall of said vessel, a bearing supported by said breaker arms at a point remote from their points of mounting, a rotatable shaft axially supported from a point above said vessel and journalled in said bearing, an agitator blade mounted on said shaft between, and in shearing relation with, said breaker arms and said inner wall, and a radial agitator blade mounted on said shaft.

19. A mixing apparatus comprising in combination a vertical vessel, a plurality of breaker arms mounted on the inner wall of said vessel and extending in an axial direction in spaced relation to said inner wall, a bearing in said vessel supported by said breaker arms at a point near the bottom of the vessel, a rotatable shaft axially supported from a point above said vessel and journalled in said bearing, an agitator blade mounted on said shaft between, and in shearing relation with, said breaker arms and said inner wall, and a radial agitator blade mounted on said shaft and adapted to shift material in a generally axial direction and in a generally radial direction.

20. A mixing apparatus comprising in combination a vessel, a bearing within said vessel spaced from the inner wall thereof, a breaker arm supporting said bearing and extending therefrom in a generally axial direction and in spaced substantially parallel relation to an element of said wall, a rotatable shaft journalled in and projecting through said bearing and axially supported from a point without said vessel, and an agitator blade mounted on the projecting portion of said shaft, said agitator blade having shearing engagement for the greater part of its length with said inner wall and with said breaker arm.

21. A mixing apparatus comprising in combination a vessel, a bearing within said vessel spaced from the inner wall thereof, a breaker arm extending outwardly from said bearing in a generally axial direction and in spaced substantially parallel relation to an element of said wall, a rotatable shaft journalled in and projecting through said bearing and axially supported from a point without said vessel, and an inclined agitator blade mounted on the projecting portion of said shaft in cooperative relation to said inner wall and to said breaker arm.

22. A mixing apparatus comprising in combination a vertical vessel, a bearing within said vessel but spaced from the inner walls thereof, a plurality of breaker arms supporting said bearing and extending upwardly therefrom in spaced substantially parallel relation to the inner side wall of said vessel the upper end of said breaker arms being secured to said inner side wall at the upper portion of said vessel, a rotatable shaft journalled in said bearing and having an end thereof projecting through said bearing to a point above the bottom of said vessel, and a rearwardly inclined agitator blade mounted on the projecting end of said shaft in cooperative relation to the inner wall of said vessel and to said breaker arms.

23. A mixing apparatus comprising in combination a vertical vessel, a bearing within said vessel but spaced from the inner walls thereof, a plurality of breaker arms extending from said bearing in spaced substantially parallel relation to the inner side wall of said vessel and secured to said inner side wall at the upper portion of said vessel, the angle formed between adjacent breaker arms being substantially the same for all of the breaker arms, a rotatable shaft journalled in said bearing and having a portion thereof projecting through said bearing, and a plurality of rearwardly inclined agitator blades mounted on the projecting portion of said shaft in shearing relation with the inner wall of said vessel and with said breaker arms, the inclination of said agitator blades and the number of said blades relative to the number of said breaker arms being such that the shearing action between said blades and said breaker arms is substantially constant throughout rotation of the agitator blades.

24. A mixing apparatus comprising in combination a vessel, a bearing within said vessel spaced from the inner wall thereof, a breaker arm extending from said bearing in a generally axial direction and in spaced substantially parallel relation to an element of said wall, a rotatable shaft journalled in and projecting through said bearing and axially supported from a point without said vessel, an inclined agitator blade mounted on the projecting portion of said shaft in cooperative relation to said inner wall and to said breaker arm, a radial arm carried by said breaker arm, and a radial blade mounted on said shaft in cooperative relation with said radial arm.

25. A mixing apparatus comprising in combination a vertical vessel, a bearing within said vessel but spaced from the inner walls thereof, a plurality of breaker arms extending from said bearing in spaced substantially parallel relation to the inner side wall of said vessel and secured to said inner side wall at the upper portion of said vessel, the angle formed between adjacent breaker arms being substantially the same for all of the breaker arms, a rotatable shaft journalled in said bearing and having a portion thereof projecting through said bearing, a plurality of rearwardly inclined agitator blades mounted on the projecting portion of said shaft in shearing relation with the inner wall of said vessel and with said breaker arms, the inclination of said agitator blades and the number of said blades relative to the number of said breaker arms being such that the shearing action between said blades and said breaker arms is substantially constant throughout rotation of the agitator blades, radial cross-arms mounted on said breaker arms, and radial blades mounted on said shaft in shearing relation with said cross-arms.

26. A mixing apparatus comprising in combination a vertical vessel, a bearing located axially near the bottom inner wall of the vessel but spaced from said wall, a plurality of breaker arms secured to the inner side wall of said vessel at the upper portion of said vessel and extending from said bearing in spaced substantially parallel relation to said inner side wall, the angle formed between adjacent breaker arms being substantially the same for all of the breaker arms, a rotatable shaft journalled in said bearing and having an end thereof projecting through said bearing, a plurality of rearwardly inclined agitator blades mounted on the projecting end of said shaft in shearing relation with the inner wall of said vessel and with said breaker arms, the inclination of said agitator blades and the number of said blades relative to the number of said breaker arms being such that the shearing action between said blades and said breaker arms is substantially constant throughout rotation of the agitator blades, radial cross-arms mounted on said breaker arms, and radial blades mounted on said shaft in shearing relation with said cross-arms, said radial blades being adapted to shift material in a vertical direction.

27. In a mixing apparatus, a vessel, a rotatable shaft axially disposed within said vessel, a breaker arm axially disposed within said vessel, a plurality of inclined agitator blades mounted on said shaft and adapted to cooperate with the inner wall of said vessel and with said breaker arm, and a ring connecting the ends of said agitator blades.

28. A mixing apparatus comprising in combination a vessel, a rotatable shaft axially supported from a point without said vessel, a breaker arm supported by an inner wall of said vessel and extending within said vessel in an axial direction and in spaced relation to said wall, a plurality of agitator blades mounted on said shaft in cooperative relation with said arm and with said wall, and a ring connecting the ends of said agitator blades.

29. A mixing apparatus comprising in combination a vertical vessel, a bearing within said vessel but spaced from the inner walls thereof, a plurality of breaker arms secured to the inner side wall of said vessel at the upper portion of said vessel and extending from said bearing in spaced substantially parallel relation to said inner side wall, a rotatable shaft journalled in said bearing and having a portion thereof projecting through said bearing, a plurality of rearwardly inclined agitator blades mounted on the projecting portion of said shaft in shearing relation with the inner wall of said vessel and with said breaker arms, and a ring connecting the ends of said agitator blades.

30. A mixing apparatus comprising in combination a vessel, a shaft axially journaled within said vessel, a bearing for said shaft spaced from the inner walls of said vessel, means for supporting said bearing, and an agitator blade mounted on said shaft between said bearing and its supporting means on the one side and said inner walls on the other side, said blade cooperating substantially throughout its length with the greater portion of the inner walls of said vessel.

31. A mixing apparatus comprising in combination a vessed, a shaft axially journaled within said vessel, a bearing for said shaft spaced from the inner walls of said vessel, means for supporting said bearing, and an agitator blade mounted on said shaft between said bearing and its supporting means on the one side and said inner walls on the other side, said blade cooperating in shearing relation substantially throughout its length with the greater portion of the inner walls of said vessel and with said supporting means.

32. A mixing apparatus comprising in combination a vessel, a shaft axially journaled within said vessel, a bearing for said shaft spaced from the inner walls of said vessel, means for supporting said bearing, an agitator blade mounted on said shaft between said bearing and its supporting means on the one side and said inner walls on the other side, said blade cooperating substantially throughout its length with the greater portion of the inner walls of said vessel, radial breaker arms mounted on said supporting means, and radial agitator blades mounted on said shaft in cooperative relation with said breaker arms.

33. A mixing apparatus comprising in combination a vessel, a shaft axially journaled within said vessel, a bearing for said shaft spaced from the inner walls of said vessel, means for supporting said bearing, an inclined ribbon agitator blade mounted on said shaft between said bearing and its supporting means on the one side and said inner walls on the other side, said blade cooperating in shearing relation substantially throughout its length with the greater portion of the inner wall of said vessel and with said supporting means, radial breaker arms mounted on said supporting means, and radial agitator blades mounted on said shaft in cooperative relation with said breaker arms.

In testimony whereof we affix our signatures.

IRVING T. THORNTON.
JOYCE H. CROWELL.